3,786,039
METHOD OF PRODUCING α-L-ASPARTYL-L-PHENYLALANINE LOWER ALKYL ESTERS
Yasuo Ariyoshi and Masanori Nagao, Kawasaki, Naotake Sato, Tokyo, Akira Shimizu, Kawasaki, and Jiro Kirimura, Tokyo, Japan, assignors to Ajinomoto Co., Inc., Tokyo, Japan
No Drawing. Filed Apr. 15, 1970, Ser. No. 28,972
Claims priority, application Japan, Apr. 30, 1969, 44/33,349
Int. Cl. C07c 103/52
U.S. Cl. 260—112.5         2 Claims

ABSTRACT OF THE DISCLOSURE

Lower alkyl esters of α-L-aspartyl-L-phenylalanine of the formula

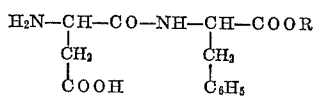

wherein R is lower alkyl are prepared by reacting an N-acyl-L-aspartic anhydride with a lower alkyl ester of L-phenylalanine in an inert organic solvent, and then removing the acyl group which may be formyl, carbobenzoxy, or p-methoxycarbobenzoxy.

---

This invention relates to a method of producing α-L-aspartyl-L-phenylalanine lower alkyl esters.

The esters are known sweeteners having a taste closely similar to that of cane sugar (Belgian Pat. No. 717,373). They were prepared heretofore by reacting esters of L-phenylalanine with a derivative of aspartic acid in which the amino group and the β-carboxy group had been masked and the α-carboxy group had been converted to a reactive functional group. After the reaction, the masking groups had to be removed (see Dutch published application 6800870).

The known method requires many steps and various reagents, and its overall yield is low so that it is not suitable for industrial application.

It has now been found that the lower alkyl esters of L-phenylalanine can be reacted directly in inert organic solvents with L-aspartic anhydride having its amino group protected by a formyl, carbobenzoxy, or p-methoxycarbobenzoxy group which is removed after the reaction to yield the desired α-L-aspartyl-L-phenylalanine esters.

The corresponding β-aspartyl derivatives are produced as by-products in small amounts and are readily separated from the desired α-aspartyl derivatives. The β-L-aspartyl-L-phenylalanine esters have a weak, bitter taste and are not suitable as sweeteners.

The N-formyl-, N-carbobenzoxy-, and N-p-methoxycarbobenzoxy-L-aspartic anhydrides are prepared by reacting the corresponding acids with acetic anhydride in an amount of 1.0 to 1.2 moles per mole of the N-acyl-L-aspartic acid at 0° to 60° C. in an organic solvent. The N-acyl-L-aspartic anhydrides are reacted with preferably 1 to 2 moles of the methyl, ethyl, or propyl ester of L-phenylalanine to the intermediate N-acyl-L-aspartyl-L-phenylalanine ester in any organic solvent capable of dissolving the reactants and inert to the same. Suitable solvents include, but are not limited to ethyl acetate, methyl propionate, tetrahydrofuran, dioxane, ethyl ether, chloroform, N,N-dimethylformamide, benzene, toluene, and glacial acetic acid.

The reaction proceeds smoothly even at room temperature, but can be accelerated by heating the reaction mixture, the upper limit of useful temperatures being determined by the extent to which racemization is tolerable. Temperatures above 60° C. should not normally be selected, and racemization is practically suppressed at temperatures of 30° C. or less.

The N-acyl groups are removed from the condensation product in any desired conventional manner as by catalytic hydrogenation or with hydrogen bromide or hydrogen chloride. The esters of α-L-aspartyl-L-phenylalanine contain some β-isomer unless the β-derivative was removed at an earlier stage, and are readily purified by recrystallizing from water or from a mixture of water and a water-soluble organic solvent such as aqueous methanol or ethanol.

If it is preferred to separate the β-derivative from the α-derivative prior to removal of the N-acyl groups from the condensation product, and the different solubilities of their salts with phenylalanine esters in ethyl acetate or other organic solvents may be relied upon. Generally, the amount of the α-aspartyl derivative is at least 4.5 times the amount of the β-derivative, and the separation of the isomers is easy.

The high yields of the α-isomer are surprising in view of the results of the known reactions between N-carbobenzoxy-L-aspartic anhydride with glycine ethyl ester and L-tyrosine ethyl ester (J.C.S. 1952, 24) in which the α- and β-isomers of the N-carbobenzoxy amino acid esters are formed in amounts of 19% and 21% respectively for the glycine derivative, and 40% and 15% for the tyrosine derivative. The β-isomer is formed predominantly in the reaction of N-acetyl-L-asparatic anhydride with aniline (J.C.S. 1953, 453) to the corresponding anilide. In the known reactions of N-masked L-aspartic anhydride, the nature of the solvent has often been found to affect the ratio of α- and β-isomer in the product formed, yet the nature of the solvent has been found to be irrelevant in the method of this invention as long as the solvent is inert and effective in dissolving the reactants.

The following examples further illustrate the invention.

EXAMPLE 1

9.0 g. L-phenylalanine methyl ester hydrochloride were suspended in 80 ml. chloroform, and 4.4 g. triethylamine were added to dissolve the ester and make the solution neutral. 100 ml. ethyl ether were added, and the mixture was cooled in an ice bath for ten minutes, whereby triethylamine hydrochloride was precipitated. It was filtered off and washed, and the combined filtrate and washings were evaporated in a vacuum to recover the methyl ester of L-phenylalanine.

The ester and 5.0 g. N-carbobenzoxy-L-aspartic anhydride were dissolved in 100 ml. ethyl acetate, and the solution was stirred for five hours. After standing overnight, the precipitated crystals were dissolved by heating the mixture, and the solution was cooled to room temperature thereafter and stirred. The crystals again precipitated were recovered by filtering and weighed 2.2 g.

The filtrate was diluted with 50 ml. ethyl acetate and extracted with 1 N hydrochloric acid and then with water. The extracts were evaporated in a vacuum, and the residue, when recrystallized from a mixture of methanol and ether yielded 3.5 g. L-phenylalanine methyl ester hydrochloride.

The ethyl acetate layer was dried with anhdyrous sodium sulfate and evaporated to dryness in a vacuum. The residue was dissolved in 150 ml. 75% acetic acid and hydrogenated at room temperature with agitation in the presence of 1.0 g. 5% palladium-on-charcoal catalyst. The hydrogenation mixture was filtered to remove the catalyst, and the filtrate was evaporated to dryness in a vacuum. The residue, when recrystallized from water, yielded 4.0 g. needle-shaped α-L-aspartyl-L-phenylalanine methyl ester which melted at 234° to 235° C. (decomp.) and was further identified by its infrared spectrum, paper chromatogram, and elementary analysis.

Calc. for $C_{14}H_{18}O_5N_2 \cdot \frac{1}{2}H_2O$ (percent): C, 55.44; H, 6.31; N, 9.24. Found (percent): C, 55.45; H, 6.10; N, 9.39.

The crystals recovered from ethyl acetate after the reaction of L-phenylalanine methyl ester with N-carbobenzoxy-L-aspartic anhydride as described above were recrystallized from ethyl acetate, and needle-shaped crystals were obtained in an amount of 1.3 g. They melted at 138.0° to 138.5° C. and were identified as the L-phenylalanine methyl ester salt of N-carbobenzoxy-$\beta$-L-aspartyl-L-phenylalanine methyl ester by its infrared spectrum and its elementary analysis:

Calc. for $C_{32}H_{37}O_9N_3$ (percent): C, 63.25; H, 6.14; N, 6.92. Found (percent): C, 63.35; H, 6.21; N, 6.63.

The crystalline material was hydrogenated for 4 hours at room temperature in 100 ml. 75% acetic acid in the presence of 0.2 g. 5% palladium-charcoal catalyst, and the hydrogenation product was recrystallized from aqueous ethanol. There were obtained 0.6 g. $\beta$-L-aspartyl-L-phenylalanine methyl ester as needles melting at 188° to 189° C. (decomp.) which were identified by their nitrogen content of 9.32%, as compared to 9.24% as calculated above for the $\alpha$-isomer.

EXAMPLE 2

4.8 g. L-phenylalanine methyl ester hydrochloride were suspended in 40 ml. chloroform, and dissolved by addition of 2.3 g. triethylamine. When 50 ml. ether were added to the cooled solution, triethylamine hydrochloride was precipitated and could be removed by filtration, and L-phenylalanine methyl ester was recovered by evaporation of the combined filtrate and ether washings. The ester was dissolved in 50 ml. ethyl acetate, and 5.0 g. N-carbobenzoxy-L-aspartic anhydride were added to the solution. The reaction mixture was stirred at room temperature for one hour. After standing overnight, the solution obtained was extracted with 1 N hydrochloric acid and then with water, and dried over anhydrous sodium sulfate.

The dried solution was evaporated in a vacuum, and the residue was dissolved in 150 ml. 75% acetic acid and hydrogenated at room temperature for five hours in the presence of 0.8 g. of a 5% Pd/charcoal catalyst. The catalyst was removed by filtration of the hydrogenation mixture, the filtrate was evaporated in a vacuum, and the residue was recrystallized from water.

The needle-shaped crystals weighed 3.2 g. and were identified as pure $\alpha$-L-aspartyl-L-phenylanaline methyl ester by their infrared spectrum and melting point and by paper electrophoresis in aqueous acetic acid at pH 2.77 and 30 v./cm. When the chromatogram was developed with ninhdyrin, only a single spot was found.

The mother liquor yielded 1.1 g. of a crystalline mixture of $\alpha$- and $\beta$-L-aspartyl-L-phenylalanine methyl ester.

EXAMPLE 3

2.06 g. dicyclohexylcarbodiimide dissolved in 20 ml. tetrahydrofuran were added to a solution of 2.67 g. p-methoxycarbobenzoxy-L-aspartic acid in the same solvent. N-p-methoxycarbobenzoxy-L-aspartic anhydride formed in the solution within about one hour.

A solution of L-phenylalanine ethyl ester in 20 ml. chloroform prepared from 2.63 g. of the hydrochloride and 1.68 ml. triethylamine was slowly added to the anhydride solution, and the mixture was stirred for two hours. The dicyclohexylurea formed was removed by filtration, the filtrate was evaporated, and the residue was dissolved in 50 ml. chloroform. The chloroform solution was extracted with dilute hydrochloric acid and then with water, dried over anhydrous sodium sulfate, and evaporated.

The crystalline residue was suspended in a mixture of 10 ml. methanol and 15 ml. acetic acid, and hydrogenated at room temperature for four hours in the presence of 0.8 g. of a 5% palladium-charcoal catalyst. The catalyst was removed from the hydrogenation mixture by filtering, and the filtrate was evaporated to dryness. The white powdery residue was crystallized from hot water, and 1.96 g. $\alpha$-L-aspartyl-L-phenylalanine ethyl ester of M.P. 246°–247° C. (decomp.) were obtained. The compound was identified by elementary analysis.

Calc. for $C_{15}H_{20}O_5N_2 \cdot \frac{1}{2}H_2O$ (percent): C, 56.77; H, 6.67; N, 8.83. Found (percent): C, 56.57; H, 6.60; N, 8.80.

EXAMPLE 4

L-phenylalanine methyl ester was prepared from 9.0 g. of the hydrochloride as described in Example 1 and dissolved in 50 ml. N,N-dimethylformamide. The solution was stirred with 2.9 g. N-formyl-L-aspartic anhydride at room temperature for one hour, and the mixture was left to stand overnight. The solvent was then evaporated in a vacuum, the residue was dissolved in ethyl acetate, and the solution was stored overnight in a refrigerator, whereby crystals were precipitated.

When recovered by filtration, washed with ethyl acetate, and dried, the crystals weighed 6.4 g. and melted at 131°–133° C. After recrystallization from ethyl acetate, there were obtained 5.1 g. crystals melting at 134.5° to 135.5° C. which were identified as the L-phenylalanine methyl ester salt of N-formyl-L-aspartyl-L-phenylalanine methyl ester by their infrared spectrum and by elementary analysis.

Calc. for $C_{25}H_{31}O_8N_3$ (percent): C, 59.87; H, 6.23; N, 8.38. Found (percent): C, 59.61; H, 6.37; N, 8.35.

5.0 g. crystals were dissolved in chloroform, and the chloroform solution was extracted with dilute hydrochloric acid and water, dried, and evaporated. The residue was dissolved in 75 ml. of 75% aqueous methanol, and a mixture of 1 ml. concentrated hydrochloric acid and 10 ml. methanol was added. The mixture was stirred for 24 hours at room temperature, and then neutralized with equivalent of sodium hydrogen carbonate solution.

After standing overnight in a refrigerator, the solution yielded 2.6 g. crystalline $\alpha$-L-aspartyl-L-phenylalanine methyl ester melting at 233° to 234° C. (decomp.), having a purity of at least 95%, and identified as in Example 2.

EXAMPLE 5

16 g. (0.06 mole) N-carbobenzoxy-L-aspartic acid were suspended in 24 ml. ethyl acetate, and 7.7 g. (0.072 mole) 96% acetic anhydride were added. The suspension was stirred for six hours at room temperature to produce a solution of N-carbobenzoxy-L-aspartic anhyride.

15.5 g. L-phenylalanine methyl ester hydrochloride were suspended in a mixture of 100 ml. water and 150 ml. ethyl acetate. After 7.3 g. sodium hydrogen carbonate had been added to the suspension with shaking, two liquid layers formed.

The ethyl acetate layer was added to the afore-mentioned solution of N-carbobenzoxy-L-aspartic anhydride over a period of 15 minutes with stirring, and stirring was continued thereafter at room temperature for six hours. The solvent was evaporated in a vacuum, and the residue was dissolved in a mixture of 90 ml. methanol and 45 ml. water. 2.2 g. sodium hydrogen carbonate and 1 g. 5% palladium/charcoal catalyst were added and the intermediate formed by the condensation reaction was hydrogenated at room temperature for five hours.

After removal of the catalyst, the hydrogenation mixture was evaporated to dryness in a vacuum, and the residue was dissolved in 1500 ml. water. 5 $\mu$l. of the solution were subjected to electrophoresis as described in Example 2. When stained with cadmium-ninhydrin by the method of J. Heilmann et al. [Z. Physiol. Chem., 309, 219 (1957)], the chromatogram showed two spots respectively corresponding to $\alpha$- and $\beta$-L-aspartyl-L-phenylalanine methyl ester. The spots were excised, eluted with methanol, and the absorbances of the eluates were measured at 510 m$\mu$.

The solution was found to contain 14.8 g. α-L-aspartyl-L-phenylalanine methyl ester (81% yield) and 3.3 g. of the β-isomer (18% yield).

11.4 g. needle-shaped crystals of the pure α-isomer were recovered from the solution by evaporating the same in a vacuum and recrystallizing the residue from water. The crystals were found free from the β-isomer by electrophoresis.

The propyl ester of α-L-aspartyl-L-phenylalanine was prepared in a manner analogous to the procedure of Example 3 without difficulty, but was not further investigated.

What is claimed is:

1. A method of producing an α-L-aspartyl-L-phenylalanine lower alkyl ester which comprises:
   (a) reacting N-acyl-L-aspartic acid with acetic anhydride in an organic solvent,
       (1) the amount of said acetic anhydride being 1.0 to 1.2 mole per mole of said N-acyl-L-aspartic acid,
       (2) said reacting being continued until said N-acyl-L-aspartic acid is converted in said solvent to N-acyl-L-aspartic anhydride;
   (b) adding to the resulting solution a lower alkyl ester of phenylalanine, and reacting said anhydride with said ester in said solution until N-acyl-α-L-aspartyl-L-phenylalanine lower alkyl ester is formed as an intermediate,
       (1) said acyl being formyl, carbobenzoxy, or p-methoxycarbobenzoxy,
       (2) said solvent being inert to said acid, to said anhydride, and to said esters;
   (c) removing said acyl from said intermediate; and
   (d) recovering the α-L-aspartyl-L-phenylalanine lower alkyl ester formed thereby.

2. A method as set forth in claim 1, wherein said acyl is carbobenzoxy.

References Cited

Le Quesne, W. J. et al.: Journal of Chemical Society (British), January–March (1952), pp. 24 to 28 relied on.

Buchanan, D. L. et al.: Journal of Biochemistry, No. 10, vol. 5, (1966), pp. 3240 to 3245 relied on.

LORRAINE A. WEINBERGER, Primary Examiner

L. A. THAXTON, Assistant Examiner